US 009889451 B2

(12) United States Patent
Filippelli et al.

(10) Patent No.: US 9,889,451 B2
(45) Date of Patent: Feb. 13, 2018

(54) METHOD TO REDUCE MERCURY, ACID GAS, AND PARTICULATE EMISSIONS

(71) Applicant: ADA-ES, Inc., Highlands Ranch, CO (US)

(72) Inventors: Gregory M. Filippelli, Catonsville, MD (US); Sharon Sjostrom, Sedalia, CO (US); Kenneth Baldrey, Denver, CO (US); Constance Senior, Littleton, CO (US)

(73) Assignee: ADA-ES, INC., Highlands Ranch, CO (US)

( * ) Notice: Subject to any disclaimer, the term of this patent is extended or adjusted under 35 U.S.C. 154(b) by 0 days.

(21) Appl. No.: 15/096,056

(22) Filed: Apr. 11, 2016

(65) Prior Publication Data

US 2016/0263585 A1  Sep. 15, 2016

Related U.S. Application Data

(63) Continuation-in-part of application No. 14/460,817, filed on Aug. 15, 2014, now Pat. No. 9,308,493.
(Continued)

(51) Int. Cl.
*B01D 46/00* (2006.01)
*B01D 53/50* (2006.01)
(Continued)

(52) U.S. Cl.
CPC .............. *B03C 3/017* (2013.01); *B01D 53/10* (2013.01); *B01D 53/40* (2013.01); *B01D 53/508* (2013.01);
(Continued)

(58) Field of Classification Search
CPC ...... B01D 46/00; B01D 53/50; B01D 53/508; B01D 53/64
See application file for complete search history.

(56) References Cited

U.S. PATENT DOCUMENTS 4,626,418 A * 12/1986 College .................. B01D 53/50
423/242.5
5,672,323 A † 9/1997 Bhat
(Continued)

FOREIGN PATENT DOCUMENTS

CA  1067835 A * 12/1979 ............... B03C 3/01
CN  105381680 A * 3/2016 ........... B01D 53/685

OTHER PUBLICATIONS

Granite, Evan J., et al. "The thief process for mercury removal from flue gas." Journal of environmental management 84.4 (2007): 628-634.†

*Primary Examiner* — Timothy C Vanoy
(74) *Attorney, Agent, or Firm* — Sheridan Ross P.C.

(57) ABSTRACT

A waste gas is contacted with a mercury removal agent to remove mercury and a flue gas conditioning agent to alter a resistivity and/or cohesivity of particulates. The flue gas conditioning agent can be substantially free of $SO_3$ and/or comprise more than about 25 wt. % $SO_3$, and/or the mercury removal agent can be substantially unaffected by the flue gas conditioning agent. An amount of mercury removed from the waste gas in the presence of the flue gas conditioning agent can be the same or more than that removed from the waste gas in the absence of the flue gas conditioning agent. An amount of the acid gas removed, by an acid gas removal agent, from the waste gas in the presence of the flue gas conditioning agent can be the same or more than that removed from the waste gas in the absence of the flue gas conditioning agent.

29 Claims, 11 Drawing Sheets

Related U.S. Application Data

(60) Provisional application No. 61/919,428, filed on Dec. 20, 2013, provisional application No. 61/866,876, filed on Aug. 16, 2013, provisional application No. 62/194,034, filed on Jul. 17, 2015.

(51) Int. Cl.
*B01D 53/64* (2006.01)
*B03C 3/017* (2006.01)
*B01D 53/10* (2006.01)
*B03C 3/013* (2006.01)
*B01D 53/83* (2006.01)
*B01D 53/40* (2006.01)

(52) U.S. Cl.
CPC ............ *B01D 53/64* (2013.01); *B01D 53/83* (2013.01); *B03C 3/013* (2013.01); *B01D 2251/206* (2013.01); *B01D 2251/30* (2013.01); *B01D 2251/40* (2013.01); *B01D 2251/404* (2013.01); *B01D 2251/604* (2013.01); *B01D 2251/606* (2013.01); *B01D 2253/102* (2013.01); *B01D 2257/302* (2013.01); *B01D 2257/602* (2013.01); *B01D 2258/0283* (2013.01)

(56) References Cited

U.S. PATENT DOCUMENTS

| | | | |
|---|---|---|---|
| 5,875,722 A * | 3/1999 | Gosselin, Jr. | B01D 53/50 110/215 |
| 6,001,152 A * | 12/1999 | Sinha | B01D 53/508 110/216 |
| 7,514,052 B2 * | 4/2009 | Lissianski | B01D 53/56 423/210 |
| 9,308,493 B2 * | 4/2016 | Filippelli | B01D 53/64 |
| 2004/0040438 A1 * | 3/2004 | Baldrey | B03C 3/013 95/62 |
| 2007/0140941 A1 * | 6/2007 | Comrie | B01D 53/64 423/215.5 |
| 2013/0139738 A1 * | 6/2013 | Grubbstrom | B01D 5/0012 110/205 |

\* cited by examiner
† cited by third party

| Parameter Identification | Units | |
|---|---|---|
| Boiler Manufacturer | | Babcock and Wilcox |
| Furnace Type | | Pressurized Front Wall Fired |
| Unit Rating | MW$_G$ | 330 |
| Minimum Load | MW$_G$ | 150 |
| NO$_x$ Control | | LNB (SmartBurn®), OFA |
| SO$_x$ Control | | Compliance Coal |
| Particulate Matter Control Device | | ESP |
| FF Manufacturer | | Buell |
| SCA | ft²/kacfm | 200 |
| ESP Construction | | Weighted Wire |
| Air Heater Type | | Tubular |
| Typical APH Inlet Operating Temperature | °F | 570 |
| Typical ESP Operating Temperature | °F | 290 |
| Typical ESP Velocity | fps | 5.33 |
| Flue Gas Flow Rate at Stack | MMacfm | 1.05 |
| Typical Stack Temperature | °F | 290 |
| Flue Gas Conditioning Agent | | SO$_3$ |
| Typical SO$_3$ Conditioning Concentration | ppm | 23 (±1) |
| Loss on Ignition (LOI) | wt% | 5 – 12% |

FIG. 5

| Test Day | | | | | | | | | | | | | | | | | | | | |
|---|---|---|---|---|---|---|---|---|---|---|---|---|---|---|---|---|---|---|---|---|
| Date | | | 9/19 | | 9/25 | 9/26 | 9/27 | 10/4 | 10/5 | 10/6 | 10/7 | 10/8 | 10/9 | 10/10 | 10/11 | 10/12 | 10/13 | 10/14 |
| Day | | | Mon | Tu | Sun | Mon | Tue | Tue | Wed | Thu | Fri | Sat | Sun | Mon | Tue | Wed | Thu | Fri |
| Sequence | Test Event # | Coal Sample | 1 | to | 7 | 8 | 9 | 12 | 13 | 14 | 15 | 16 | 17 | 18 | 19 | 20 | 21 | 22 |
| Mobilization | | N | x | x | | | | | | | | | | | | | | |
| System Check | | N | | | x | | | | | | | | | | | | | |
| ATI-2001™ Proof of Concept Test + CaBr2 (0800 to 1800) | P1 | Y | | | | x | | | | | | | | | | | | |
| ATI-2001™ + Trona @ 0.5 (SR=0.9) + CaBr2 (0800 to 2200) | P2 | Y | | | | | x | | | | | | | | | | | |
| ATI-2001™ + Trona @ 1.0 (SR=1.8) + CaBr2 (0800 to 1300) | P3/3 | Y | | | | | x | x | | | | | | | | | | |
| ATI-2001™ + Trona @ 1.5 (SR=2.7) + CaBr2 (1300 to 1800) | P4 | Y | | | | | | x | | | | | | | | | | |
| ATI-2001™ + Trona @ 1.5 (SB=2) + ACI 0.5 lb/MMacf (0800 to 1100) | P5 | Y | | | | | | | x | | | | | | | | | |
| ATI-2001™ + Trona @ 1.1 (SR=2) + ACI 1.0 lb/MMacf (1100 to 1430) | P6 | Y | | | | | | | x | | | | | | | | | |
| ATI-2001™ + Trona @ 1.1 (SB=2) + ACI 1.5 lb/MMacf (1500 to 1800) | P7 | Y | | | | | | | x | | | | | | | | | |
| ATI-2001™ + Trona @ 1.1 (SR=2) + ACI as required + CaBr2 (0800 to 1800) | P8 | Y | | | | | | | | x | | | | | | | | |
| ATI-2001™ + Trona @ 1.1 (SR=2) + ACI as required + CaBr2 (0800 to 2359) | P9 | Y | | | | | | | | x | | | | | | | | |
| ATI-2001™ + Trona @ 1.1 (SR=2) + ACI as required + CaBr2 (0000 to 0600) | P10 | Y | | | | | | | | | x | | | | | | | |
| ATI-2001™ + Trona @ 1.1 (SR=2) + ACI as required + CaBr2 (0600 to 1200) | P11 | Y | | | | | | | | | x | | | | | | | |
| Sorbent Change / Recovery | | | | | | | | | | | | | | | | | | |
| ATI-2001™ + SBC @ 0.5 (SR=0.6) + CaBr2 (0800 to 1300) | P12 | Y | | | | | | | | | | x | | | | | | |
| ATI-2001™ + SBC @ 1.0 (SR=1.2) + CaBr2 (1300 to 1800) | P13 | Y | | | | | | | | | | x | | | | | | |
| ATI-2001™ + SBC @ 1.5 (SR=1.8) + CaBr2 (1200 to 1700) | P14 | Y | | | | | | | | | | | x | | | | | |
| ATI-2001™ + SBC @ 1.1 (SR=1.3) + ACI 0.5 MMacf (0800 to 1100) | P15 | Y | | | | | | | | | | | | x | | | | |
| ATI-2001™ + SBC @ 1.1 (SR=1.3) + ACI 1.0 MMacf (1100 to 1430) | P16 | Y | | | | | | | | | | | | x | | | | |
| ATI-2001™ + SBC @ 1.1 (SR=1.3) + ACI 1.5 MMacf (1500 to 1800) | P17 | Y | | | | | | | | | | | | x | | | | |
| ATI-2001™ + SBC @ 1.1 (SR=1.3) + ACI as required + CaBr2 (0800 to 1800) | P18 | Y | | | | | | | | | | | | | x | | | |
| ATI-2001™ + SBC @ 1.1 (SR=1.3) + ACI as required + CaBr2 (1800 to 2359) | P19 | Y | | | | | | | | | | | | | x | | | |
| ATI-2001™ + SBC @ 1.1 (SR=1.3) + ACI as required + CaBr2 (0000 to 0600) | P20 | | | | | | | | | | | | | | | x | | |
| Manual Measurements (Method 5, 26A, 101A, 202) | | | | | | | | | | | | | | | | | | |
| Sorbent Trap Method | | | | | | | | | | | | | | | | | | |
| Demobilization | | | | | | | | | | | | | | | | | x | x |
| Load Regime | | | | | | | | | | | | | | | | | | |
| High Load (~380 MW₀) | | | | | x | x | x | x | x | x | x | x | x | x | P18 | P20 | x | x |
| Mid Load (~220 MW₀) | | | | | | | | | | | | | | | P19 | | | |
| Low Load (~150 MW₀) | | | | | | | | | | | | | | | | P20 | | |

METHOD TO REDUCE MERCURY, ACID GAS, AND PARTICULATE EMISSIONS

CROSS REFERENCE TO RELATED APPLICATION

The present application is a continuation-in-part of and claims priority to U.S. patent application Ser. No. 14/460,817, which was filed Aug. 15, 2014, which claims priority to U.S. Provisional Application Ser. Nos. 61/866,876, filed Aug. 16, 2013, and 61/919,428, filed Dec. 20, 2013, and which also claims priority to U.S. Provisional Application Ser. No. 62/194,034, which was filed Jul. 17, 2015, each having the same title and each of which is incorporated herein by this reference in its entirety.

FIELD

The disclosure relates generally to contaminated gas treatment and particularly to contaminant removal from flue and other waste gases.

BACKGROUND

Coal fired power plants face increasingly stringent pollution control standards for acid gases and trace air toxics, including sulfur dioxide ($SO_2$), sulfur trioxide ($SO_3$), and mercury (Hg). This requires current best control practices for sorbent pollution control processes to be improved. Commonly, plants utilize control practices such as activated carbon injection (ACI) and dry sorbent injection (DSI). In many cases, however, further increase in sorbent injection rate is uneconomical, ineffective, or adversely impacts the pollution control process. Additionally, use of DSI for acid gas control can cause severe performance degradation in electrostatic precipitators, leading to challenges in particulate emission control.

A common approach to mercury control involves injecting a sorbent in the form of a carbonaceous material, such as powdered activated carbon, for mercury sorption. Acid gases (including $SO_2$) are controlled through DSI, with common sorbents including trona, hydrated lime, and sodium bicarbonate. Finally, $SO_3$ is commonly used as an ESP ash conditioning agent—for maintaining electrical and opacity performance—to maintain permitted particulate emissions levels.

Used in conjunction, however, the various sorbents can interfere with the performance of other sorbent(s), thereby reducing sorbent performance. By way of example, sulfur trioxide ($SO_3$), while necessary for particulate emission control, is detrimental to mercury capture with most carbon sorbents, including powder activated carbon (PAC). This effect is well documented in industry testing. $SO_3$ is captured with DSI, which is intended to target $SO_2$ in the flue gas. While this allows carbon sorbents to perform better at mercury control, it also removes beneficial $SO_3$ that otherwise would be used for ESP conditioning. This results in degraded ESP performance and particulate emission control.

Accordingly, a solution is required that will allow for a combination of standard emission control technologies while maintaining multiple contaminant emission targets. The solution must maintain particulate collection and acid gas control targets while satisfying mercury removal targets (MATS compliance), especially in units utilizing carbon injection for mercury control.

SUMMARY

These and other needs are addressed by the various aspects, embodiments, and configurations of the present disclosure. A method is provided to reduce mercury, acid gas, and particulate emissions from coal fired power plants.

A method can include the steps:

(a) receiving a contaminated waste gas comprising particulates, an acid gas, and mercury;

(b) contacting the waste gas with a mercury removal agent (e.g., sorbent) to remove or cause the removal of mercury from the waste gas and a flue gas conditioning agent to alter a resistivity and/or cohesivity of the particulates; and (c) removing most of the mercury and particulates from the waste gas to produce a treated gas.

The method can further include one or more of the following being true:

(i) the flue gas conditioning agent is substantially free of $SO_3$, wherein an amount of mercury removed from the waste gas in the presence of the flue gas conditioning agent is at least the same as an amount of mercury removed from the waste gas in the absence of the flue gas conditioning agent;

(ii) the flue gas conditioning agent comprises more than about 25 wt. % $SO_3$ and the mercury removal agent is substantially unaffected by the flue gas conditioning agent, wherein an amount of mercury removed from the waste gas in the presence of the flue gas conditioning agent is at least the same as an amount of mercury removed from the waste gas in the absence of the flue gas conditioning agent; and (iii) wherein the waste gas is contacted with an acid gas removal agent (e.g., sorbent) to remove or cause the removal of the acid gas from the waste gas and wherein an amount of the acid gas removed from the waste gas in the presence of the flue gas conditioning agent is at least the same as an amount of the acid gas removed from the waste gas in the absence of the flue gas conditioning agent.

When (i) is true, the mercury removal agent can include one or more of a halogen and activated carbon, and the flue gas conditioning agent can contain no more than about 1 wt.% $SO_3$.

The flue gas conditioning agent can be one or more of the flue gas conditioning agents sold under the tradenames ATI-2001™ and RESPond™, an alkali metal, alkaline earth metal, or rare earth nitrite, an alkali metal, alkaline earth metal, or rare earth nitrate, ammonium nitrite, and ammonium nitrate.

The flue gas conditioning agent can include one or more of sodium nitrite, sodium nitrate, lithium nitrite, lithium nitrate, barium nitrite, barium nitrate, cerium nitrite, cerium nitrate, ammonium nitrite and ammonium nitrate.

The mercury removal agent can be contacted with the waste gas upstream of an air preheater, and the flue gas conditioning agent can be contacted with the waste gas downstream of the air preheater.

The mercury removal agent can be contacted with the waste gas at a first location downstream of a second location where the flue gas conditioning agent is contacted with the waste gas, and a distance between the first and second locations is commonly about 10 feet or more.

When (ii) is true, the mercury removal agent can include one or more of ammonium halide, amine halide, and quaternary ammonium halide.

The mercury removal agent can be contacted with the waste gas upstream of an air preheater, and the flue gas conditioning agent can be contacted with the waste gas downstream of the air preheater.

The mercury removal agent can be contacted with the waste gas at a first location downstream of a second location where the flue gas conditioning agent is contacted with the waste gas, and a distance between the first and second locations is commonly about 10 feet or more.

When (iii) is true, the acid gas removal agent can be one or more of trona, a bicarbonate, and a hydroxide.

The acid gas removal agent can be contacted with the waste gas upstream of a preheater.

The acid gas removal agent can be contacted with the waste gas downstream of a prheater.

When (i) and (iii) are both true, the acid gas removal agent can be contacted with the waste gas upstream of where the mercury removal agent is contacted with the waste gas stream.

Both the acid gas removal agent and mercury removal agent can be contacted with the waste gas stream upstream of an air preheater, and the flue gas conditioning agent can be contacted with the waste gas stream downstream of the air preheater.

Both the acid gas removal agent and mercury removal agent can be contacted with the waste gas stream downstream of an air preheater, and the flue gas conditioning agent can be contacted with the waste gas stream downstream of the air preheater.

The acid gas removal agent can be contacted with the waste gas upstream of an air preheater, the mercury removal agent can be contacted with the waste gas stream downstream of an air preheater, and the flue gas conditioning agent can be contacted with the waste gas stream downstream of the air preheater.

The mercury removal agent can be contacted with the waste gas upstream of an air preheater, the acid gas removal agent can be contacted with the waste gas stream downstream of an air preheater, and the flue gas conditioning agent can be contacted with the waste gas stream downstream of the air preheater.

A method can be provided that includes the steps:

(a) receiving a contaminated waste gas comprising particulates, $SO_2$, and mercury;

(b) contacting the waste gas with a carbon sorbent to remove or cause the removal of mercury from the waste gas and a flue gas conditioning agent to improve an ability of an electrostatic precipitator to remove the particulates; and (c) removing at least most of the mercury and particulates from the waste gas to produce a treated gas.

The method can include one or both of the following being true:

(i) the flue gas conditioning agent does not diminish or otherwise inhibit mercury sorption by the carbon sorbent; and (ii) the waste gas is contacted with a dry sorbent injection ("DSP") sorbent for $SO_2$ control, and the flue gas conditioning agent does not react or otherwise interact with the DSI sorbent.

The present disclosure can provide a number of advantages depending on the particular configuration. Embodiments of the waste gas treatment system can combine multiple low capital-cost control technologies for acid gas and mercury reduction. The embodiments can achieve high levels of mercury control while injecting an alternative Flue Gas Conditioning (FGC) agent for ESP performance. The alternative FGC agent, or non-$SO_3$ based flue gas conditioning agent, maintains ESP performance and allows mercury and alkaline sorbents to work in harmony without otherwise detrimental cross effects. The embodiments can accommodate simultaneous use of activated carbon and dry sorbent injection systems, along with an electrostatic precipitator. They can maintain particulate emissions control levels. This can be accomplished by monitoring and controlling electrical performance, as well as opacity levels and particulate measurements when using the alternative ash conditioning agent in place of $SO_3$ ash conditioning. They can reduce mercury emission levels. Vapor phase mercury emissions can be reduced when replacing $SO_3$ ash conditioning with the alternative ash conditioning agent. They can reduce HCl, $SO_2$, $SO_3$, and other acid gas emissions. The invention contemplates minimal effects on mercury control technologies, particulate matter (PM) emissions, and plant balance.

These and other advantages will be apparent from the disclosure of the aspects, embodiments, and configurations contained herein.

The phrases, "at least one", "one or more", and "and/or", are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

An "acid" is a chemical substance having the ability to react with bases and certain metals (like calcium) to form salts. There are three common definitions for acids: the Arrhenius definition, the Brønsted-Lowry definition, and the Lewis definition. The Arrhenius definition defines acids as substances which increase the concentration of hydrogen ions ($H^{3O}$), or more accurately, hydronium ions ($H_3O^+$), when dissolved in water. The Brønsted-Lowry definition is an expansion: an acid is a substance which can act as a proton donor. By this definition, any compound which can easily be deprotonated can be considered an acid. Examples include alcohols and amines which contain O—H or N—H fragments. A Lewis acid is a substance that can accept a pair of electrons to form a covalent bond. Examples of Lewis acids include all metal cations, and electron-deficient molecules such as boron trifluoride and aluminium trichloride.

"Acid gas" refers to any type of gas or gaseous mixture which forms an acidic compound when mixed with water. The most common types of acid gases are hydrogen sulfide ($H_2S$), sulfur oxides ($SO_X$) (which can form sulfuric acid when mixed with water), nitric oxides ($NO_X$) (which can form nitric acid when mixed with water), and carbon monoxide (CO) and/or carbon dioxide ($CO_2$) (which can form carbonic acid when mixed with water).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces)) or chemisorption (characteristic of covalent bonding). It may also occur due to electrostatic attraction.

An "alkali" is a basic, ionic salt of an alkali metal or alkaline earth metal chemical element. Some authors also define an alkali as a base that dissolves in water. A solution of a soluble base has a pH greater than 7.0. The adjective "alkaline" is commonly used as a synonym for basic, especially for soluble bases.

"Ash" refers to the residue remaining after complete or partial combustion of the coal particles. Ash typically includes mineral matter (silica, alumina, iron oxide, etc.).

A "base" is a substance that reacts with acids to form salts and can promote certain chemical reactions (base catalysis). For a substance to be classified as an Arrhenius base, it must produce hydroxide ions in solution. Examples of Arrhenius bases are the hydroxides of the alkali and alkaline earth metals (NaOH, $Ca(OH)_2$, etc.). In the Brønsted-Lowry acid-base theory, a base is a substance that can accept hydrogen ions ($H^+$)—otherwise known as protons. In the Lewis model, a base is an electron pair donor. Bases can be thought of as the chemical opposite of acids. Bases and acids are seen as opposites because the effect of an acid is to increase the hydronium ($H_3O^+$) concentration in water, whereas bases reduce this concentration. A reaction between an acid and base is called neutralization. In a neutralization reaction, an aqueous solution of a base reacts with an aqueous solution of an acid to produce a solution of water and salt in which the salt separates into its component ions.

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Carbonaceous" refers to a carbon-containing material, particularly a material that is substantially rich in carbon.

A "carbonate" is a carbonate is a salt of carbonic acid, characterized by the presence of the carbonate ion, $CO^{2-}_3$, or an ester of carbonic acid, an organic compound containing the carbonate group $C(=O)(O—)_2$.

"Coal" refers to a combustible material formed from prehistoric plant life. Coal includes, without limitation, peat, lignite, sub-bituminous coal, bituminous coal, steam coal, anthracite, and graphite. Chemically, coal is a macromolecular network comprised of groups of polynuclear aromatic rings, to which are attached subordinate rings connected by oxygen, sulfur, and aliphatic bridges.

A "composition" refers to one or more chemical units composed of one or more atoms, such as a molecule, polyatomic ion, chemical compound, coordination complex, coordination compound, and the like. As will be appreciated, a composition can be held together by various types of bonds and/or forces, such as covalent bonds, metallic bonds, coordination bonds, ionic bonds, hydrogen bonds, electrostatic forces (e.g., van der Waal's forces and London's forces), and the like.

"Flue-gas desulfurization" or "FGD" refers to a set of technologies to remove gas-phase sulfur dioxide ($SO_2$), particularly from exhaust flue gases of fossil-fuel power plants and from the emissions of other sulfur oxide emitting processes.

"Halogen" refers to an electronegative element of group VIIA of the periodic table (e.g., fluorine, chlorine, bromine, iodine, astatine, listed in order of their activity with fluorine being the most active of all chemical elements).

"Halide" refers to a binary compound of the halogens.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as $Fe_2O_3$, while "low iron coals" refer to coals having a total iron content of less than about 10 wt. % (dry basis of the ash), typically expressed as $Fe_2O_3$. As will be appreciated, iron and sulfur are typically present in coal in the form of ferrous or ferric carbonates and/or sulfides, such as iron pyrite.

"High sulfur coals" refer to coals having a total sulfur content of at least about 1.5 wt. % (dry basis of the coal) while "medium sulfur coals" refer to coals having between about 1.5 and 3 wt. % (dry basis of the coal) and "low sulfur coals" refer to coals typically having a total sulfur content of less than about 1.5 wt. % (dry basis of the coal), more typically having a total sulfur content of less than about 1.0 wt. %, and even more typically having a total sulfur content of less than about 0.8 wt. % of the coal (dry basis of the coal).

"Lime" is a general term for calcium-containing inorganic materials, in which carbonates, oxides and hydroxides predominate. Strictly speaking, lime is calcium oxide. "Hydrated lime" is calcium hydroxide and is the form most commonly used in dry sorbent injection.

"Means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

A "particle" refers to a solid, colloid, or microencapsulated liquid with no limitation in shape or size.

"Particulate" refers to fine particles, such as fly ash, unburned carbon, soot and fine process solids, typically entrained in a gas stream.

The phrase "ppmw X" refers to the parts-per-million, based on weight, of X alone. It does not include other substances bonded to X.

The phrase "ppmv X" refers to the parts-per-million, based on volume, of X alone. It does not include other substances bonded to X.

The terms "remove" or "removing" include the sorption, precipitation, adsorption, absorption, conversion, deactivation, decomposition, degradation, and/or neutralization of a target material.

A "scrubber" or "scrubber system" is an air pollution control device that can be used to remove some particulates and/or gases from industrial exhaust streams. Traditionally, the term "scrubber" has referred to a pollution control device to "wash out" acid gases in an exhaust stream, such as a flue gas.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 5 is a test schedule matrix;

FIG. 6 is a plot of ESP secondary power [KW], boiler load [MW], AH out temperature [° F.], alkaline injection [lbm/hr]+100, spark rate [spm], opacity [%], ATI-2001™ injection×10 [lbm/ton], and $SO_3$ injection [ppm] (vertical axes) vs. date (horizontal axis);

DETAILED DESCRIPTION

Overview

Figure 1:
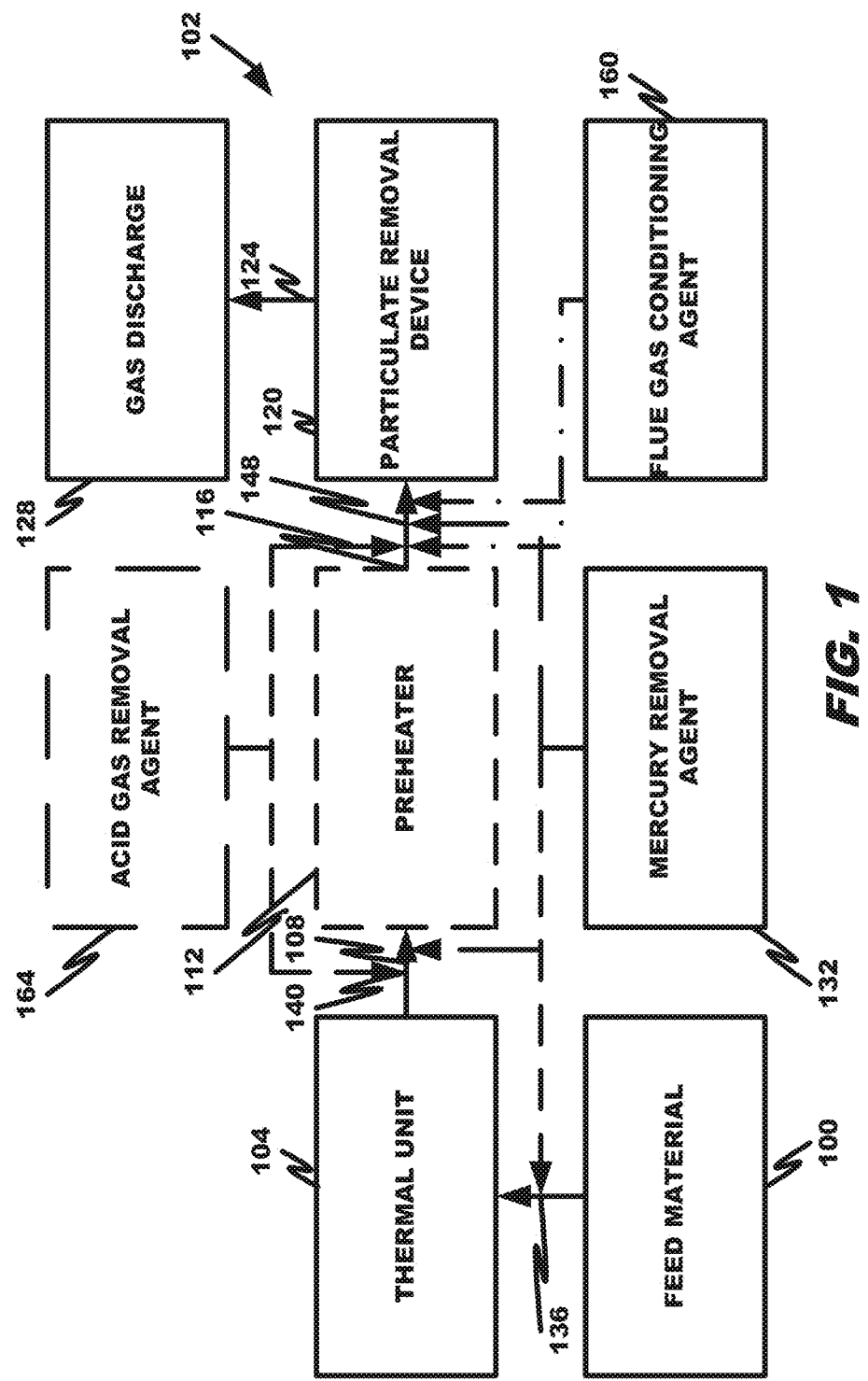
FIG. 1 is a block diagram according to an embodiment.

A waste gas treatment system of this disclosure can use a flue gas conditioning ("FGC") agent to provide improve electrostatic precipitator ("ESP") performance by lowering electrical resistivity of entrained particulates and by increasing particulate cohesivity. Lowering particulate resistivity can improve the initial collection efficiency of ESPs, and increasing the particulate cohesivity can promote retention of the collected particulates in the ESP. Generally, FGC agents lower the high and low-temperature resistivities of particulates by raising their sodium and/or lithium levels and/or by increasing the amount of sulfur trioxide in the waste gas stream. Cohesivity of the particulates can be improved by enhancing their moisture-absorption capacities and by adding a molten composition to the particulate-laden waste gas stream.

The FGC agent can be a non-$SO_3$ additive that can remove or cause the removal of at least most of the particulates in the waste gas by providing appropriate particulate conditioning to maintain ESP performance (opacity, etc.) while not diminishing or otherwise inhibiting mercury sorption by carbon sorbents and not reacting or otherwise interacting with Dry Sorbent Injection ("DSI") sorbents used for $SO_2$ and other acid gas control. In other words, the FGC agent has substantially no impact on the removal of mercury and acid gas (e.g., $SO_2$). Stated differently, the amount of mercury and/or acid gas removed by a selected mercury removal agent or DSI sorbent, respectively, in the presence of the FGC agent is at least the same or substantially the same as the amount of mercury and/or acid gas removed by the selected mercury removal agent or DSI sorbent, respectively, in the absence of the FGC agent.

The non-$SO_3$-containing FGC or alternative FGC agent commonly has no more than about 25 wt. % $SO_3$, more commonly no more than about 10 wt. % $SO_3$, more commonly no more than about 5 wt. % $SO_3$, and even more commonly no more than about 1 wt. % $SO_3$. Examples of a suitable non-$SO_3$-containing agent include the FGC agent sold by Advanced Emission Solutions, Inc., under the tradenames ATI 2001™ and RESPond, and FCG agents disclosed in U.S. Pat. Nos. 6,001,152, and 6,207,802 which are incorporated herein by this reference. The latter FGC agents include a nitrate or nitrite salt, such as an alkali metal, alkaline earth metal, and rare earth metal nitrite or nitrate (e.g., sodium nitrate, sodium nitrite, lithium nitrate, barium nitrate, and cerium nitrate), ammonium nitrite, ammonium nitrate, and mixtures thereof. The FGC agent may further include a polyhydroxy compound, preferably selected from the group consisting essentially of sucrose, fructose, glucose, glycerol, and mixtures thereof. Other non-$SO_3$ FGC agents, such as ammonia-containing agents, can be employed as will be known by those of skill in the art.

The waste gas treatment system can use a $SO_3$-containing waste gas conditioning ("FGC") agent. The agent is typically a compound containing the $SO_3$ radical. It can further include ammonia, which reacts in the waste gas with $SO_3$ to increase dust resistivity and thereby enhance ESP performance.

The waste gas treatment system can use a mercury removal agent to remove or cause the removal of at least most of the mercury, whether elemental or speciated, in the waste gas. The mercury removal agent can be in the form of a solid, liquid, vapor, or a combination thereof. Exemplary mercury removal agents include a carbonaceous material, particularly activated carbon in the form of powdered activated carbon, a halogen-containing compound, such as an elemental halogen or halide, a porous adsorptive material as described in U.S. Pat. No. 8,216,535, which is incorporated herein by this reference, and mixtures thereof. In one formulation, the mercury removal agent comprises a diatomic elemental halogen, a halide (e.g., binary halides, oxo halides, hydroxo halides, and other complex halides), an inter-halogen cation or anion, halic acid and salts thereof (e.g., bromic or iodic acid), perhalic acid and salts thereof (e.g., periodic acid and periodates), a homoatomic polyanion, and mixtures thereof. As will be appreciated, a halogen-containing compound, such as a compound containing elemental or speciated bromine, iodine, and chlorine, is believed to convert elemental mercury into speciated mercury, which is sorbed onto fly ash or activated carbon. Other mercury removal agents can be employed, including kaolinite, montmorillonite-smectite, illite, and chlorite clays.

The waste gas treatment system can use an acid gas removal agent, particularly a DSI sorbent, such as an alkaline sorbent, to remove at least most of the acid gas in the waste gas. DSI sorbents include, for example, trona (or sodium sesquicarbonate), sodium bicarbonate, calcium hydroxide (e.g., hydrated lime), and mixtures thereof.

The FGC agent can be combined with the acid gas removal agent. In an embodiment, a liquid form of the FGC agent may be applied to the acid gas removal agent and spray dried. In another a dry form of the liquid FGC agent may be mixed with a dry form of an acid gas removal agent. In both embodiments, the combined FGC agent and acid gas removal agent may be milled before or after being combined. The combined FGC agent and acid gas removal agent may be mixed before or after being co-injected into the waste gas.

Other waste gas or coal feed additives can be employed including, without limitation, iron, a mineralizer, a flow aid, and an abrasive material as described in U.S. Pat. Nos. 6,729,248, 6,773,471, and 7,332,002; a transition metal and bromine and/or iodine as described in U.S. Pat. Nos. 8,124,036 and 8,293,196; iodine as described in U.S. Pat. Nos. 8,372,362 and 8,496,894; a nitrogenous component as described in US 2012/0285352; and a metal hydroxide, a nitrogenous component and bromine and/or iodine as described in U.S. patent application Ser. No. 13/964,441, each of which is incorporated herein fully by this reference.

Waste Gas Treatment System Configurations

FIG. 1 depicts a waste gas treatment system 102 for some industrial facility applications. Referring to FIG. 1, a contaminant-containing feed material 100 is provided. In one application, the feed material 100 is combustible and can be any synthetic or natural, mercury- and/or sulfur-containing, combustible, and carbon-containing material, including coal and biomass. The feed material 100 can be a high alkali or high iron coal. In other applications, the present disclosure is applicable to noncombustible, mercury-and/or sulfur-containing feed materials, including without limitation metal-containing ores, concentrates, and tailings.

The feed material 100 can natively include, without limitation, varying levels of halogens, sulfur, and mercury. Typically, the feed material 100 includes at least about 0.001 ppmw, more typically from about 0.003 to about 100 ppmw, and even more typically from about 0.003 to about 10 ppmw mercury (both elemental and speciated) (measured by neutron activation analysis ("NAA")). Commonly, a combustible feed material 100 includes no more than about 5 ppmw bromine and/or iodine, more commonly no more than about 4 ppmw bromine and/or iodine, even more commonly no more than about 3 ppmw bromine and/or iodine, even more commonly no more than about 2 ppmw bromine and/or iodine and even more commonly no more than about 1 ppmw bromine and/or iodine (measured by NAA) and from about 0.05 to about 10 wt. % sulfur, more commonly from about 0.1 to about 7.5 wt. % sulfur, and even more commonly from about 0.15 to about 5 wt. % sulfur (measured by NAA). A combustible feed material 100 generally will produce, upon combustion, an unburned carbon ("UBC") (or LOI) content of from about 0.1 to about 30% by weight and even more generally from about 0.5 to about 20 % by weight.

The feed material 100 is combusted in thermal unit 104 to produce a contaminated waste gas 108. The thermal unit 104 can be any combusting device, including, without limitation, a dry or wet bottom furnace (e.g., a blast furnace, puddling furnace, reverberatory furnace, Bessemer converter, open hearth furnace, basic oxygen furnace, cyclone furnace, stoker boiler, cupola furnace and other types of furnaces), boiler, incinerator (e.g., moving grate, fixed grate, rotary-kiln, or fluidized or fixed bed, incinerators), calciners including multi-hearth, suspension or fluidized bed roasters, intermittent or continuous kiln (e.g., ceramic kiln, intermittent or continuous wood-drying kiln, anagama kiln, bottle kiln, rotary kiln, catenary arch kiln, Feller kiln, noborigama kiln, or top hat kiln), oven, or other heat generation units and reactors.

The waste gas 108 includes not only elemental and/or speciated mercury but also a variety of other materials. A common waste gas 108 includes at least about 0.001 ppmw, even more commonly at least about 0.003 ppmw, and even more commonly from about 0.005 to about 0.02 ppmw mercury (both elemental and speciated). Other materials in the waste gas 108 can include, without limitation, particulates (such as fly ash), sulfur oxides, nitrogen oxides, carbon oxides, unburned carbon, and other types of particulates. A typical waste gas contains from about 500 to about 5,000 mg/Nm$^3$, more typically from about 750 to about 3,500 mg/Nm$^3$, and even more typically from about 750 to about 2,500 sulfur dioxide and nitrogen oxide (NO$_x$), individually and collectively.

The temperature of the mercury-containing gas stream 108 varies depending on the type of thermal unit 104 employed. Commonly, the mercury-containing gas stream temperature is at least about 125° C., even more commonly is at least about 325° C., and even more commonly ranges from about 325 to about 500° C.

The waste gas 108 is optionally passed through the preheater 112 to transfer some of the thermal energy of the waste gas 108 to air input to the thermal unit 104. The heat transfer produces a common temperature drop in the waste gas 108 of from about 50 to about 300° C. to produce a cooled waste gas 116 temperature commonly ranging from about 100 to about 400° C.

The cooled waste gas 116 is next subjected to particulate removal device 120 to remove most of the particulates from the waste gas and form a treated gas 124. The particulate removal device 120 can be any suitable device, including an electrostatic precipitator ("ESP"), particulate filter such as a baghouse, wet particulate scrubber, and other types of particulate removal devices.

The treated gas 124 is emitted, via gas discharge 128, into the environment.

To control particulate emissions or opacity of the treated gas 124, an FGC agent 160 is contacted with the cooled waste gas 116 at one or more locations in the duct.

To control mercury emissions in the waste gas 108, a mercury removal agent 132 is employed. In one formulation, the agent 132 comprises a halogen that is composed primarily of an alkali or alkaline earth metal halide. The halogen-containing agent 132 contains no more than about 40 wt. % fixed or total carbon, more commonly no more than about 25 wt. % fixed or total carbon, even more commonly no more than about 15 wt. % fixed or total carbon, and even more commonly no more than about 5 wt. % fixed or total carbon. In one formulation, the agent 132 comprises more than about 40 wt. % fixed or total carbon and may include a halogen. An example is an activated carbon that may or may not include a halogen. In one formulation, the agent 132 comprises a halogen attached to a solid support, such as by absorption, adsorption, ion exchange, formation of a chemical composition, precipitation, physical entrapment, or other attachment mechanism. The solid support can be inorganic or organic. Examples include ion exchange resins (functionalized porous or gel polymers), soil humus, a porous carbonaceous material, metal oxides (e.g., alumina, silica, silica-alumina, gamma-alumina, activated alumina, acidified alumina, and titania), metal oxides containing labile metal anions (such as aluminum oxychloride), non-oxide refractories (e.g., titanium nitride, silicon nitride, and silicon carbide), diatomaceous earth, mullite, porous polymeric materials, crystalline aluminosilicates such as zeolites (synthetic or naturally occurring), amorphous silica-alumina, minerals and clays (e.g., bentonite, smectite, kaolin, dolomite, montmorillinite, and their derivatives), porous ceramics metal silicate materials and minerals (e.g., one of the phosphate and oxide classes), ferric salts, and fibrous materials (including synthetic (for example, without limitation, polyolefins, polyesters, polyamides, polyacrylates, and combinations thereof) and natural (such as, without limitation, plant-based fibers, animal-based fibers, inorganic-based fibers, cellulosic, cotton, paper, glass and combinations thereof). In some applications, the mercury removal agent is added to the coal prior to combustion, injected as a halogenated PAC or other halogenated sorbent, and/or injected in the form of a halogen and/or halogen precursor (at any location, as known in the art).

The mercury removal agent 132 can be contacted with the waste gas stream at one or more contact points 136, 140, and 148 (where point 136 can be remote from the location of the thermal unit, including applying the additive to the feed at places such as a mine or in transit to the thermal unit location). At point 136, the mercury removal agent 132 is added directly to the feed material 100 upstream of the thermal unit 104. At points 140 and 148, the mercury removal agent 132 is introduced into the waste gas 108 or 116, such as by injection as a liquid, vapor, or solid powder. As can be seen from FIG. 1, the agent introduction can be done upstream or downstream of the (optional) air preheater 112.

An acid gas removal agent 164 is added to the waste gas to remove at least most of the acid gases (e.g., SO$_2$ and/or NO$_x$).

In any of the above applications, the FGC agent 160, mercury removal agent 132, or acid gas removal agent 164 can be in the form of a solid, liquid, vapor, or a combination thereof. The agent can be dissolved in a liquid, commonly aqueous, in the form of a vapor, in the form of an aerosol, or in the form of a solid or supported on a solid. In one formulation, the agent is introduced as a liquid droplet or aerosol upstream or downstream of the thermal unit 104. In this formulation, the agent is dissolved in a solvent that evaporates, leaving behind solid or liquid particles of the agent.

Figure 2:
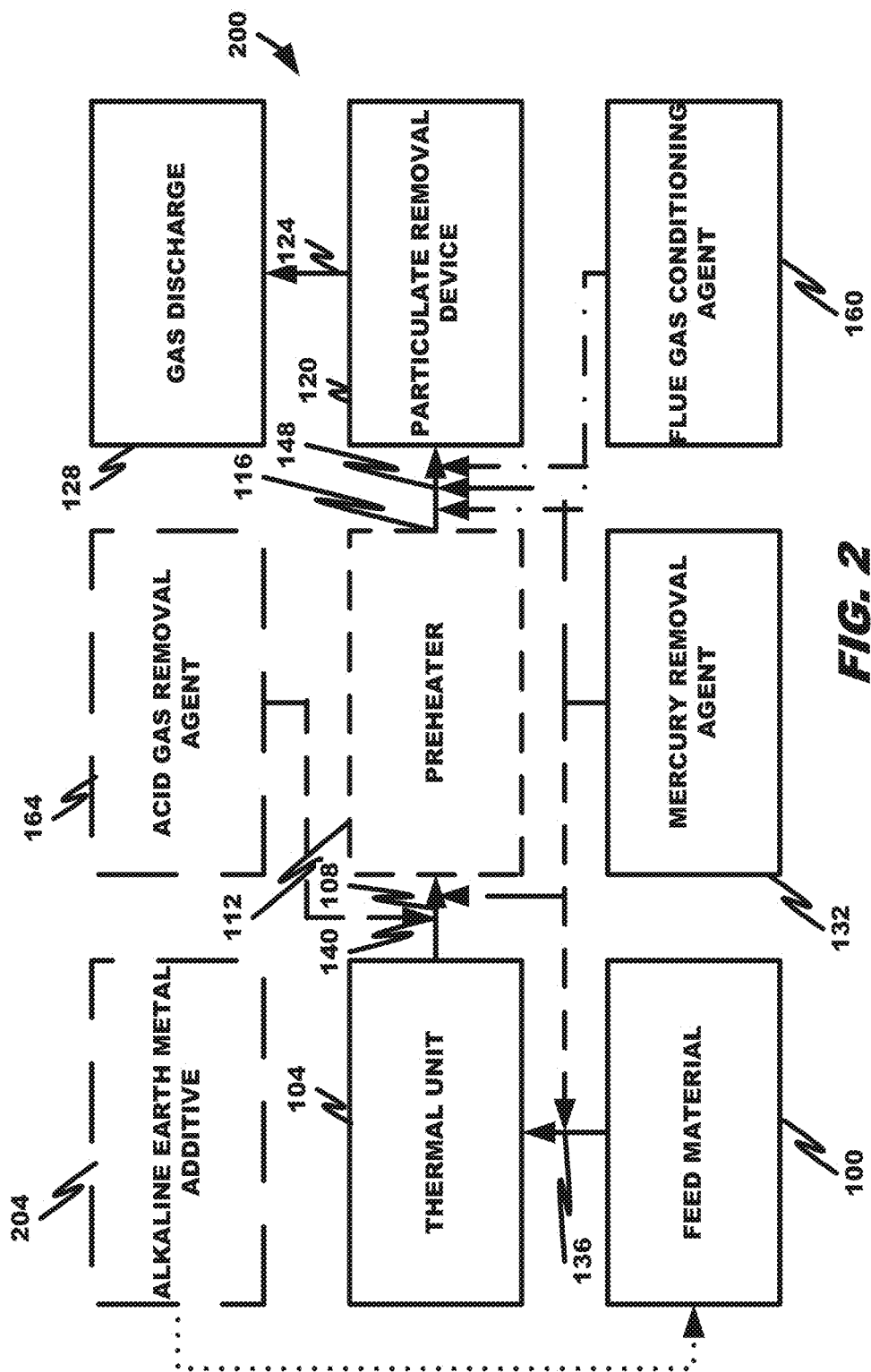
FIG. 2 is a block diagram according to an embodiment.

Referring to FIG. 2, an embodiment of the waste gas treatment system 200 is depicted. The following agents are employed: a non-SO$_3$-containing FGC agent 160 for ESP conditioning/particulate emission control, a carbon sorbent (e.g., powdered activated carbon) as the mercury removal agent132 for mercury control, and DSI acid gas removal agent 164 for acid gas control. Because the FGC agent is not SO$_3$-based, the undesired reactions between sorbents are avoided, and each sorbent (and the FGC agent) can perform its desired function. Specifically, the non-SO$_3$-containing FGC agent 160 continues to condition the ESP for particulate control, the DSI acid gas removal agent 164 can be used for acid gas control without interfering with the FGC agent, and activated carbon can be used as the mercury removal agent 132 to target mercury removal without the performance reduction associated with SO$_3$. An alkaline earth metal additive 204, which may be the same as the FGC agent 160, can be added to the feed material 100 prior to combustion. In embodiments, the DSI acid gas removal agent is sodium based and also functions as the FGC agent.

Another embodiment of the waste gas treatment system 200 incorporates an SO$_3$-tolerant mercury removal agent for mercury control. In other words, the SO$_3$-containing acid gas removal agent has substantially no impact on the removal of mercury. Stated differently, the amount of mercury removed by a selected mercury removal agent in the presence of the SO$_3$-tolerant mercury removal agent is at least the same or substantially the same as the amount of mercury removed by the selected mercury removal agent in the absence of the $SO_3$-tolerant mercury removal agent. Examples of such agents include those disclosed in U.S. Pat. No. 8,216,535, which is incorporated herein by this reference. The mercury removal agent is one or more of an ammonium halide, amine halide, and quaternary ammonium halide. The agent may be incorporated into a porous mercury adsorptive material, such as carbonaceous char, activated carbon, reactivated carbon, zeolite, silica, silica gel, alumina clay, and a combination thereof. The porous mercury adsorptive material can further include a hydrophobicity enhancement agent selected from the group consisting of elemental halogens fluorine salts, organo-fluorine compounds, fluorinated polymers, and combinations thereof. The $SO_3$-tolerant sorbent would replace or supplement activated carbon in a system comprising either $SO_3$ and/or a non-$SO_3$-containing FGC agent. Embodiments can further include DSI injection systems as described above.

In one application, the agents introduced are a mercury removal agent (halogen-based agent) combined with the feed material 100 prior to combustion, a non-$SO_3$-containing FGC agent injected into the waste gas, a carbonaceous mercury removal agent (e.g., PAC) introduced into the waste gas, and an acid gas removal agent (e.g., DSI sorbent) introduced into the waste gas.

There are generally two options for co-location of mercury removal agent (PAC) and FGC agent injection. Commonly, PAC is injected prior to the preheater 112 (or air heater) while the FGC agent is injected into the waste gas at the existing ports downstream of the preheater 112. This will optimize substantially PAC distribution and maximize residence time. The other option is to locate the PAC injection grid, or injectors, downstream of the FGC agent injection grid, or injectors, by at least about 10 feet to avoid any localized wetting or interference. In configurations where the system geometry does not account for sufficient residence time, static mixers can be implemented to improve sorbent distribution. Example uses of static mixers are described in U.S. patent application Ser. No. 13/951167, which is incorporated herein by this reference. Both of these options are depicted by the arrows in FIG. 2. The acid gas removal agent 164 is injected into the waste gas duct between the thermal unit 104 and preheater 112. It may be introduced upstream or downstream of the location of mercury removal agent injection. As will be appreciated, each arrow denotes a point of introduction of the corresponding agent into the waste gas treatment system.

Figure 3:
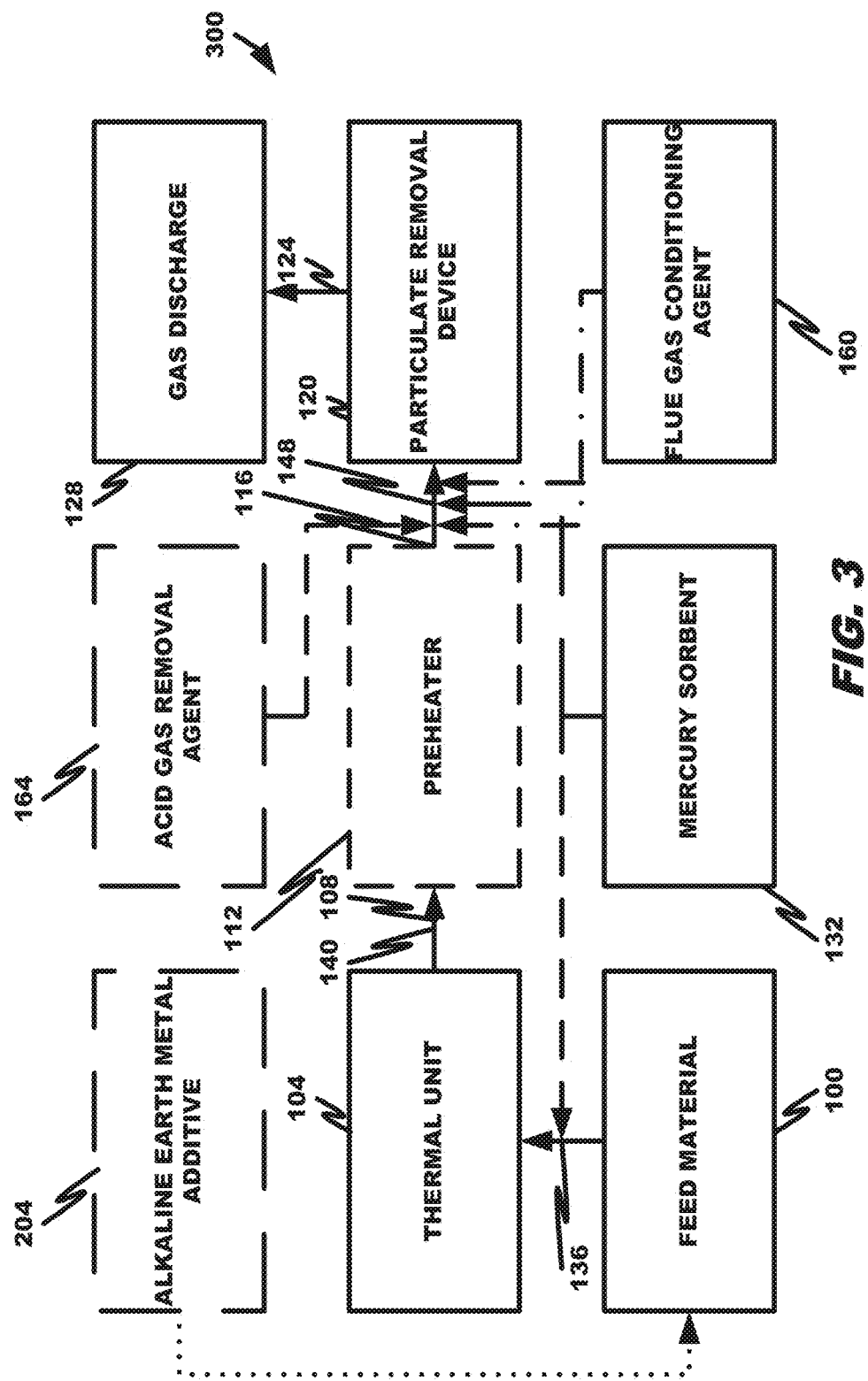
FIG. 3 is a block diagram according to an embodiment.

FIG. 3 is the same as FIG. 2 except that, in the waste gas treatment system 300 of FIG. 3, the acid gas removal agent 164 is introduced into the waste gas duct between the preheater 112 and particulate removal device 120.

In one application, the feed material 100 is treated before combustion with a (first) halogen-containing mercury removal agent. A second additive, which may be a refined coal additive such as a second halogen-containing mercury removal agent, is contacted with the feed material 100 prior to combustion. The second additive may optionally be added with or without the halogen. An acid gas removal agent, in the form of an alkaline sorbent, and a mercury removal agent are injected into the waste gas duct between the thermal unit 104 and preheater 116. Commonly, the alkaline sorbent is injected upstream of the mercury removal agent. The alkaline sorbent and mercury capture sorbent injection also can be located downstream of the preheater 116. In other applications, the alkaline sorbent is injected upstream of the air preheater 116, while the mercury capture agent is injected downstream of the air preheater 116, or vice versa. A flue gas conditioning agent is injected into the waste gas. The flue gas conditioning agent is commonly injected downstream of the air preheater 112. The flue gas conditioning agent is injected upstream of the particulate removal device 120. In embodiments, the alkaline sorbent also may function as the FGC agent.

In one application, the waste gas treatment system includes a coal fired boiler system. Halogen-containing mercury removal agents, typically bromine and/or iodine, are applied, as a halogen-containing salt or a halogen containing slurry, to the coal prior to combustion. Optionally, calcium and/or magnesium-based additives can be added to the coal prior to combustion. Dry sorbent injection utilizing trona or lime is injected into the waste gas for acid gas control. A mercury control sorbent, such as a non-halogenated or halogenated PAC is injected into the waste gas for mercury control, preferably upstream of the air preheater. The mercury control sorbent also may be injected downstream of the air preheater. In this configuration, the mercury control sorbent may be injected upstream of an optional static mixer. A non-$SO_3$-containing FGC agent, such as ATI 2001 or RESPond, is injected downstream of the air preheater, but upstream of the particulate removal device 120. The particulate control device is commonly an ESP.

In one application, the FGC agent is a wet (liquid) compound. The FGC agent is applied to an acid gas removal agent. The acid gas removal agent may be lime, or another calcium based DSI sorbent, or it may be a sodium based DSI sorbent. After the wet FGC agent is applied to the acid gas removal agent, the combined agent is spray dried. The resulting combined FGC agent and acid gas removal agent may be milled to a desired particle size, or may be injected into the waste stream without any additional treatment or processing steps.

In another application, the FGC agent is a dry compound. The FGC agent is applied to an acid gas removal agent. The acid gas removal agent may be lime, or another calcium based DSI sorbent, or it may be a sodium based DSI sorbent. After the FGC agent is applied to the acid gas removal agent, the resulting combined FGC agent and acid gas removal agent may be mixed together by any known means, or it may be milled to a desired particle size, or may be injected into the waste stream without any additional treatment or processing steps.

The combined FGC agent and acid gas removal agent may be created on site, just prior to injection into the waste gas. In other applications, the combined FGC agent and acid gas removal agent may be created off site. The combined FGC agent and acid gas removal agent may be created at the point of injection, or upstream and milled to desired particle size prior to injection. The combined FGC agent and acid gas removal agent may be used in combination with any other methods described in this disclosure or known in the art, including use with mercury removal agents or halogen containing additives.

The acid gas agent and FGC agent can be combined in any ratio. In some embodiments the mass ratio of the acid gas agent to the FGC agent is commonly 1:1, more commonly 1:1.2, even more commonly 1:1.25, still even more commonly 1:1.5, yet still even more commonly 1:1.75, yet still even more commonly 1:2, yet still even more commonly 1:3, yet still even more commonly 1:4, yet still even more commonly 1:5, yet still even more commonly 1:7, yet still even more commonly 1:7, yet still even more commonly 1:8, yet still even more commonly 1:9, yet still even more commonly 1:10, yet still even more commonly 1:15, yet still even more commonly 1:20, yet still even more commonly 1:30, yet still even more commonly 1:40, yet still even more commonly 1:50, yet still even more commonly 1:60, yet still even more commonly 1:70, yet still even more commonly 1:80, yet still even more commonly 1:90, or still yet even more commonly 1:100.

The FGC agent and the acid gas agent can be combined in any ratio. In some embodiments the mass ratio of the FGC agent to the acid gas agent is commonly 1:1, more commonly 1:1.2, even more commonly 1:1.25, still even more commonly 1:1.5, yet still even more commonly 1:1.75, yet still even more commonly 1:2, yet still even more commonly 1:3, yet still even more commonly 1:4, yet still even more commonly 1:5, yet still even more commonly 1:7, yet still even more commonly 1:7, yet still even more commonly 1:8, yet still even more commonly 1:9, yet still even more commonly 1:10, yet still even more commonly 1:15, yet still even more commonly 1:20, yet still even more commonly 1:30, yet still even more commonly 1:40, yet still even more commonly 1:50, yet still even more commonly 1:60, yet still even more commonly 1:70, yet still even more commonly 1:80, yet still even more commonly 1:90, or still yet even more commonly 1:100.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Full-scale testing was performed with dry sorbent injection ("DST") (using an alkaline sorbent) for $SO_2$ mitigation and activated carbon injection ("ACT") with coal additives for vapor phase mercury control. For electrostatic precipitators ("ESP") which rely on sufur trioxide ($SO_3$) conditioning to maintain permitted particulate levels, injection of alkaline sorbents removed a large fraction of the $SO_3$ being injected in the flue gas. Removal of $SO_3$ conditioning affected ash resistivity and ultimately degraded particulate control. To maintain the ESPs permitted particulate performance, ATI 2001™ as a flue gas conditioning agent was tested in conjunction with DSI and ACT testing.

The primary goals of the testing were: (1) establish the achievable reductions in $SO_2$ emission while (2) maintaining ESP electrical and opacity performance with the ATI-2001™, a proprietary Liquid Flue Gas Conditioning ("LFGC") agent, and (3) maintaining mercury emissions between regulation levels. The utility used for the full scale testing required $SO_3$ as an ESP conditioning agent to maintain permitted particulate emissions levels. $SO_x$ interference with mercury removal agents was encountered along with undesired alkaline sorbent side reactions with $SO_3$. Sulfur trioxide can form an acid, namely hydrosulfuric acid, which can react with the alkaline sorbent. ATI-2001™ does not react negatively with alkaline sorbents.

Due to the sensitivity of ESP performance to changes in concentrations of $SO_3$ conditioning, no attempt was made to investigate the feasibility of using a sodium-based alkaline sorbent alone as an ESP conditioning agent. Due to an equipment issue, continuous speciated $NO_x$ (i.e., NO and $NO_2$) measurements were not able to be collected during sodium sorbent injection.

Figure 4:
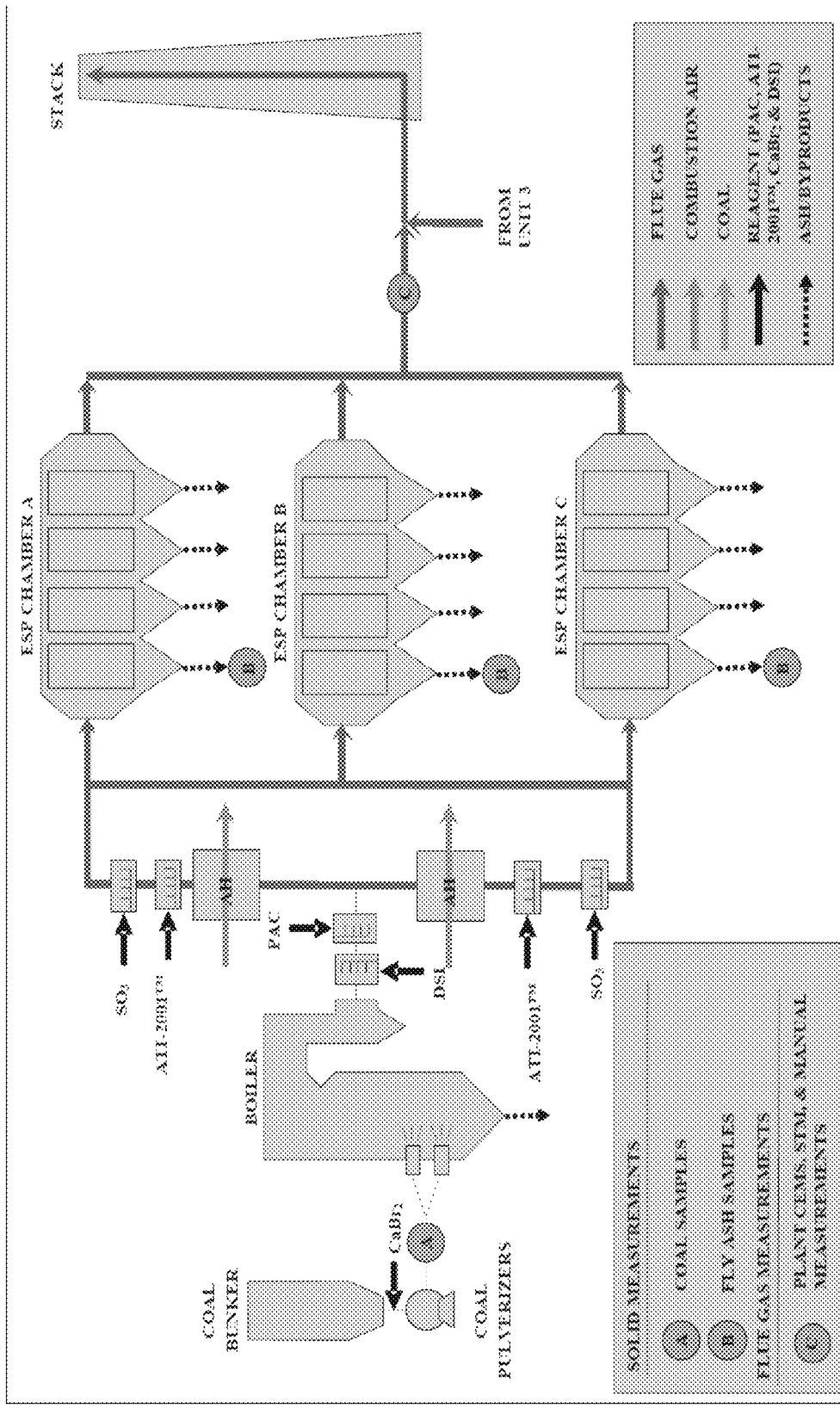
FIG. 4 is a listing of equipment in the tested utility plant facility.

The facility used for the testing has the configuration set forth in FIG. 4. The facility burns western sub-bituminous fuels. The boiler discharges through a single economizer and passes through a two-pass tubular heater that cools the flue gas to nominally 290° F. The air heater discharges into two parallel gas ducts, each of which is fed into one, three-parallel chambered ESP.

Trona ($Na_3(CO_3)(HCO_3)^{\ominus}2H_2O$) and sodium bicarbonate ($Na_2CO_3$) were selected as the alkaline acid gas sorbents. The coal additive was a halogen, which in conjunction with the high native fraction of unburned carbon from loss on ignition ("LOI"), acts as a mercury removal agent or sorbent for the high fraction of oxidized mercury enabled by the coal additive during baseline plant operation. Due to the adverse impact of sodium-based alkaline sorbents on vapor-phase mercury capture with carbon-based sorbents, an unbrominated powdered activated carbon ("PAC") was introduced into the flue gas.

The PAC injection system used is sold by ADA ES, Inc. under the tradename ADADemoPAC™. Sorbent was metered via a screw feeder into a pneumatic educator and conveyed material to the injection dispersion device on the duct. The alkaline sorbent injection system was a dry, conditioned motive air silo-based system.

Both trona and sodium bicarbonate were injected through the same injection equipment.

ATI-2001™ was injected through atomizers on the injection lances that produced an ultrafine droplet mist as the additive was sprayed into the duct as dilute chemical. The water in the droplets rapidly evaporates from the spray droplets. Once the dilution water evaporates from the droplet, the resulting chemical droplet is available to bond with moisture in the individual ash particles. By maintaining an extremely small final particle size, material deposition on downstream duct structures was mitigated and effective distribution across the ESP was facilitated.

During the test program, U.S. EPA Methods 5, 26A, 201A, and 202 were conducted. Samples were collected during formal baseline testing periods (i.e., no sorbent injection), during full load Trona injection, and then again during full load SBC injection testing comparative emission. Additional modified Method 30B Sorbent Trap Method (STMs) were periodically collected for mercury CEMS quality assurance purposes. All other data (i.e., load, temperatures, pressures, process $O_2$ concentrations) were collected from the plants existing process data collection system.

The test schedule matrix is presented in FIG. 5. The various additive combinations tested are shown in the matrix.

Figure 7:
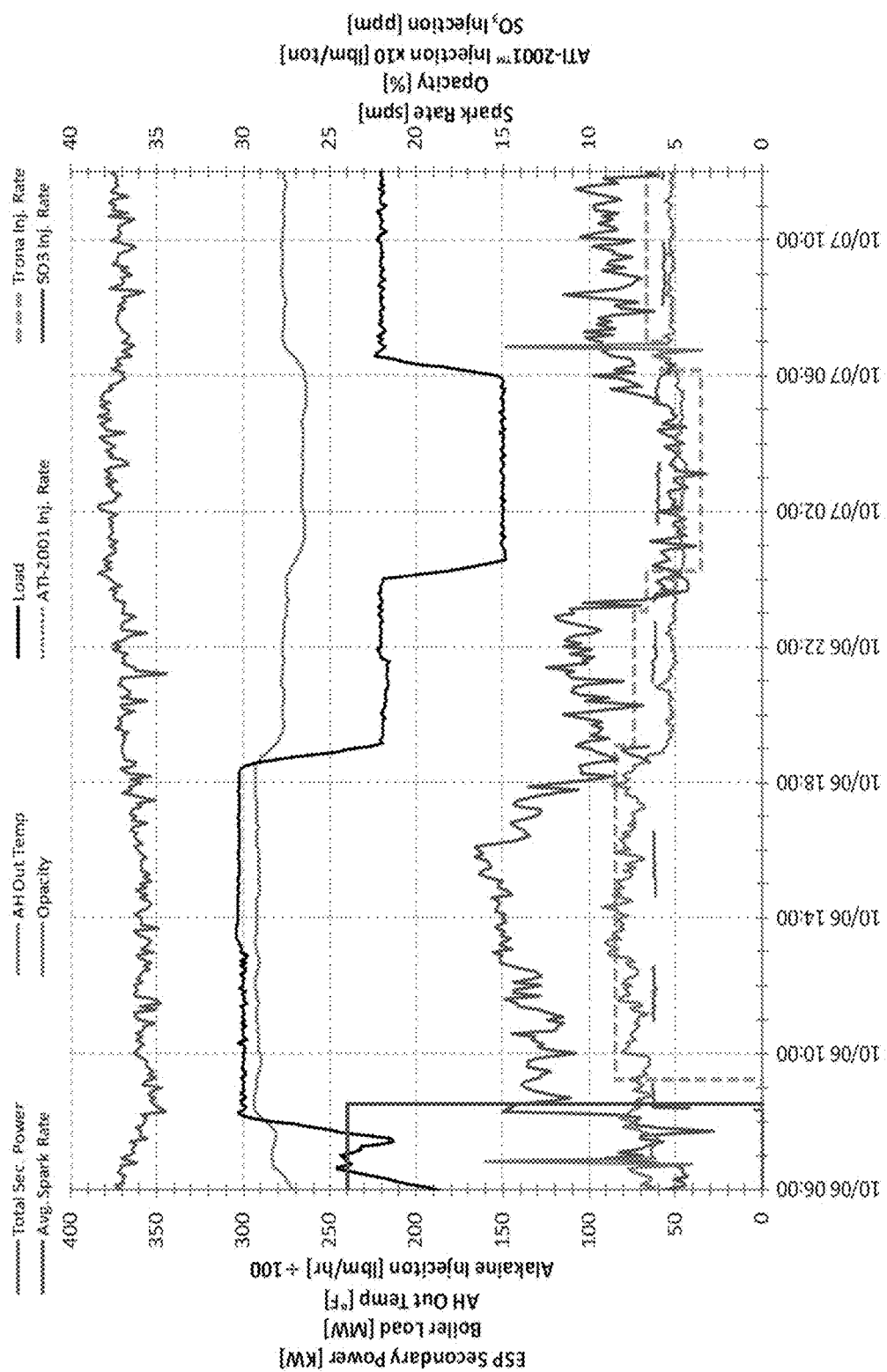
FIG. 7 is a plot of ESP secondary power [KW], boiler load [MW], AH out temperature [° F.], alkaline injection [lbm/hr]+100, spark rate [spm], opacity [%], ATI-2001™ injection×10 [lbm/ton], and $SO_3$ injection [ppm] (vertical axes) vs. date (horizontal axis)
Figure 8:
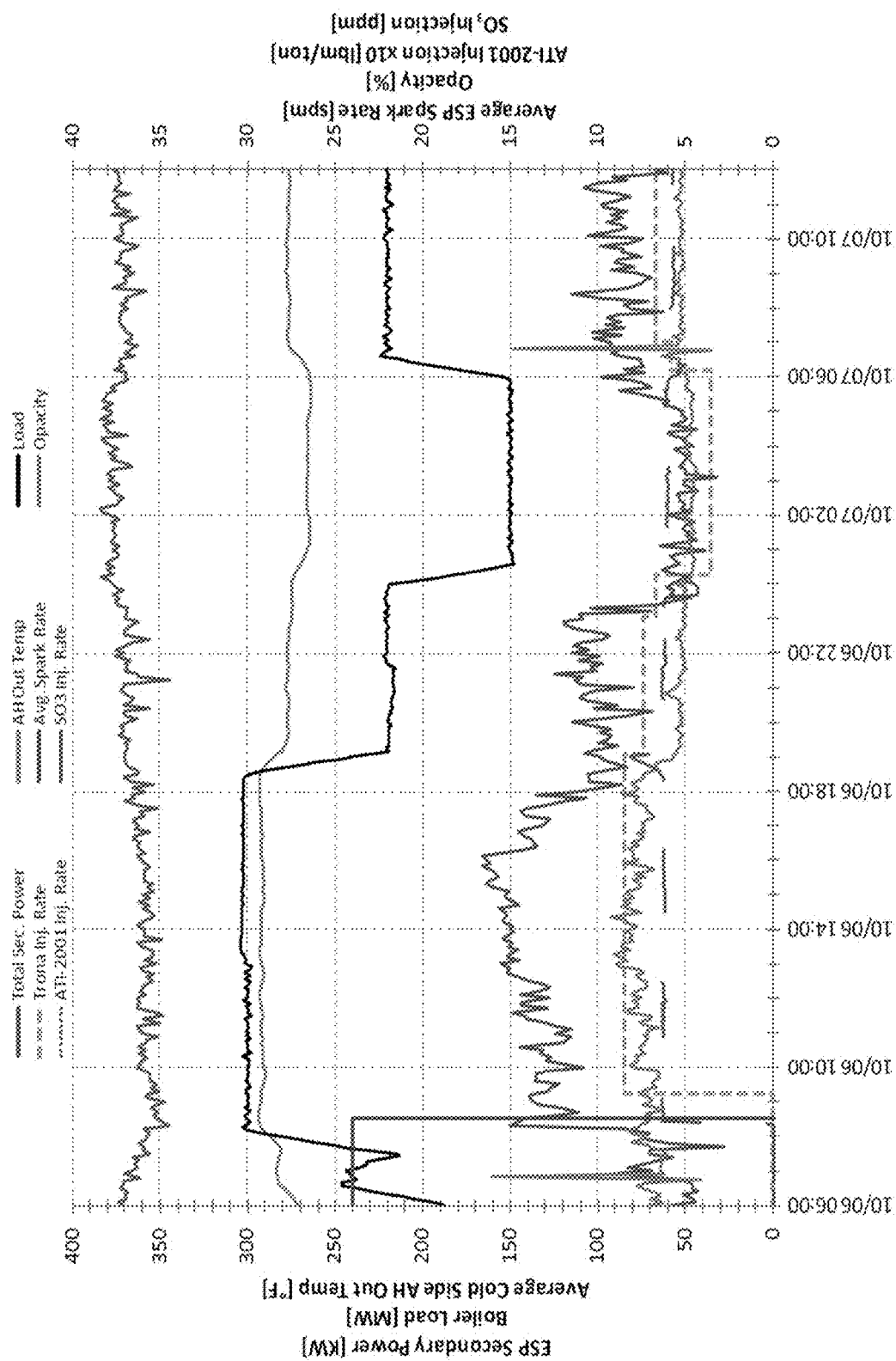
FIG. 8 is a plot of ESP secondary power [KW], boiler load [MW], AH out temperature [° F.], alkaline injection [lbm/hr]+100, spark rate [spm], opacity [%], ATI-2001υ injection×10 [lbm/ton], and $SO_3$ injection [ppm] (vertical axes) vs. date (horizontal axis)

The baseline testing determined whether ATI-2001™ could maintain opacity levels and ESP electrical performance with $SO_3$ injection system placed in standby. This test established that ATI-2001™ can maintain successfully ESP operation within permitted opacity limits. During baseline testing, the average opacity measured 6.89% and was nearly identical to the response with $SO_3$ conditioning in service. FIG. 6 shows the ESP performance data for the initial ATI-2001™ proof-of-concept test. FIG. 7 shows the ESP data during which time trona was the alkaline sorbent being injected while FIG. 8 shows the ESP data during which time sodium bicarbonate ("SBC") was the alkaline sorbent being tested. During the injection of the alkaline sorbent, ATI-2001™ was injected at constant rate injection rates and ACI was injected as needed to maintain the anticipated vapor-phase mercury compliance levels. The data shown in both plots demonstrates that average spark rate increased during periods of their respective full load test. However, total secondary power across the unit remained constant and opacity was well within permitted limits. During testing, the ESP performed comparably to the typical performance when using $SO_3$ as the ash conditioning agent.

Figure 9:
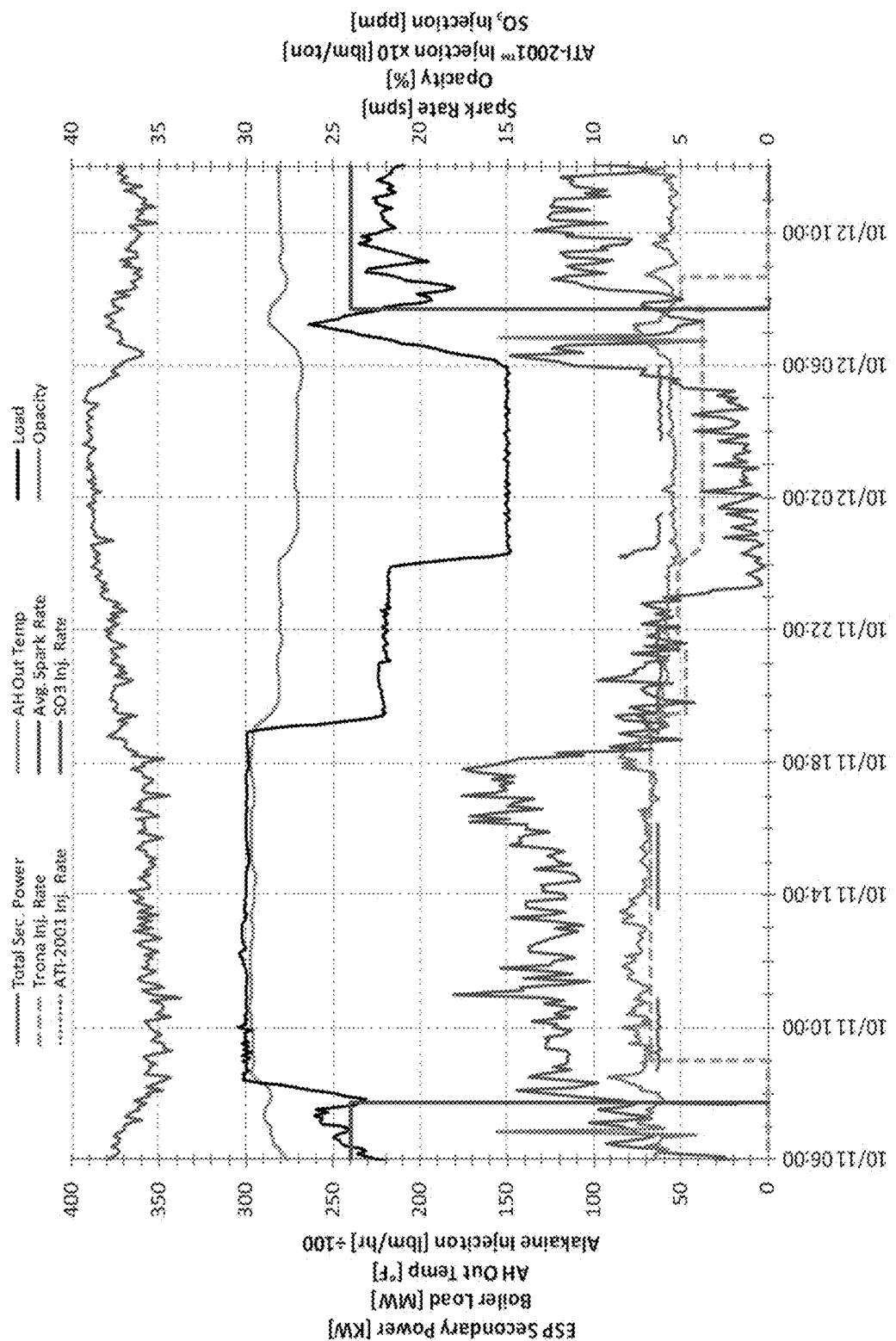
FIG. 9 is a plot of percent removal [%] vs. mass injection rate [lbm/hr]

All trona injection coincided with ATI-2001™ injection as the ESP conditioning reagent. The data from trona testing is synthesized into the parametric removal curve for high unit load testing and is presented in FIG. 9. The data presented in FIG. 9 considers only gross unit load conditions greater than 275 $MW_G$ with more than 60 minutes of stable $SO_2$ emission data. The associated regression coefficient ($R^2$) for the data set is 0.95, which is very good given the population of measurements used to compile the data from the test. Given the $SO_2$ concentrations established during baseline testing, maximum observed removal with trona was approximately 70% and corresponded to a stack emission concentration ranging between 0.174 and 0.262 lb $SO_2$ per MMBtu. The variation in the observed removals likely resulted from changes in process temperatures and velocities through the ESP. Additionally, the observed difference might be attributed to variations in coal sulfur during this testing period. During the testing, to maintain the operational goal of vapor-phase mercury less than 1.0 lb/Btu, PAC injection at approximately 0.7 lb/MMacf was required when trona was injected at rates between 7,500 to 8,800 lb/hr.

Figure 10:
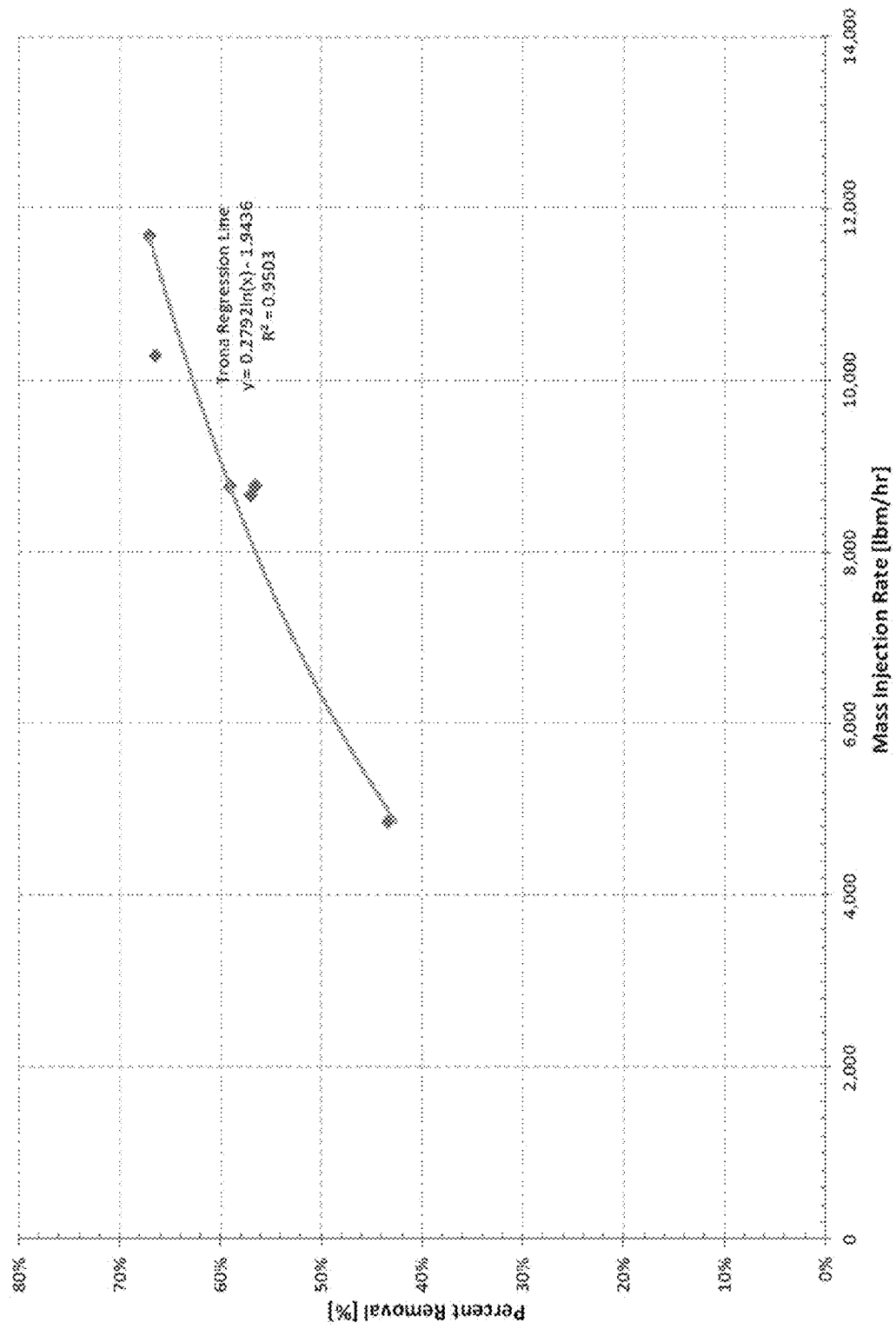
FIG. 10 is a plot of percent removal [%] vs. mass injection rate [lbm/hr]
Figure 11:
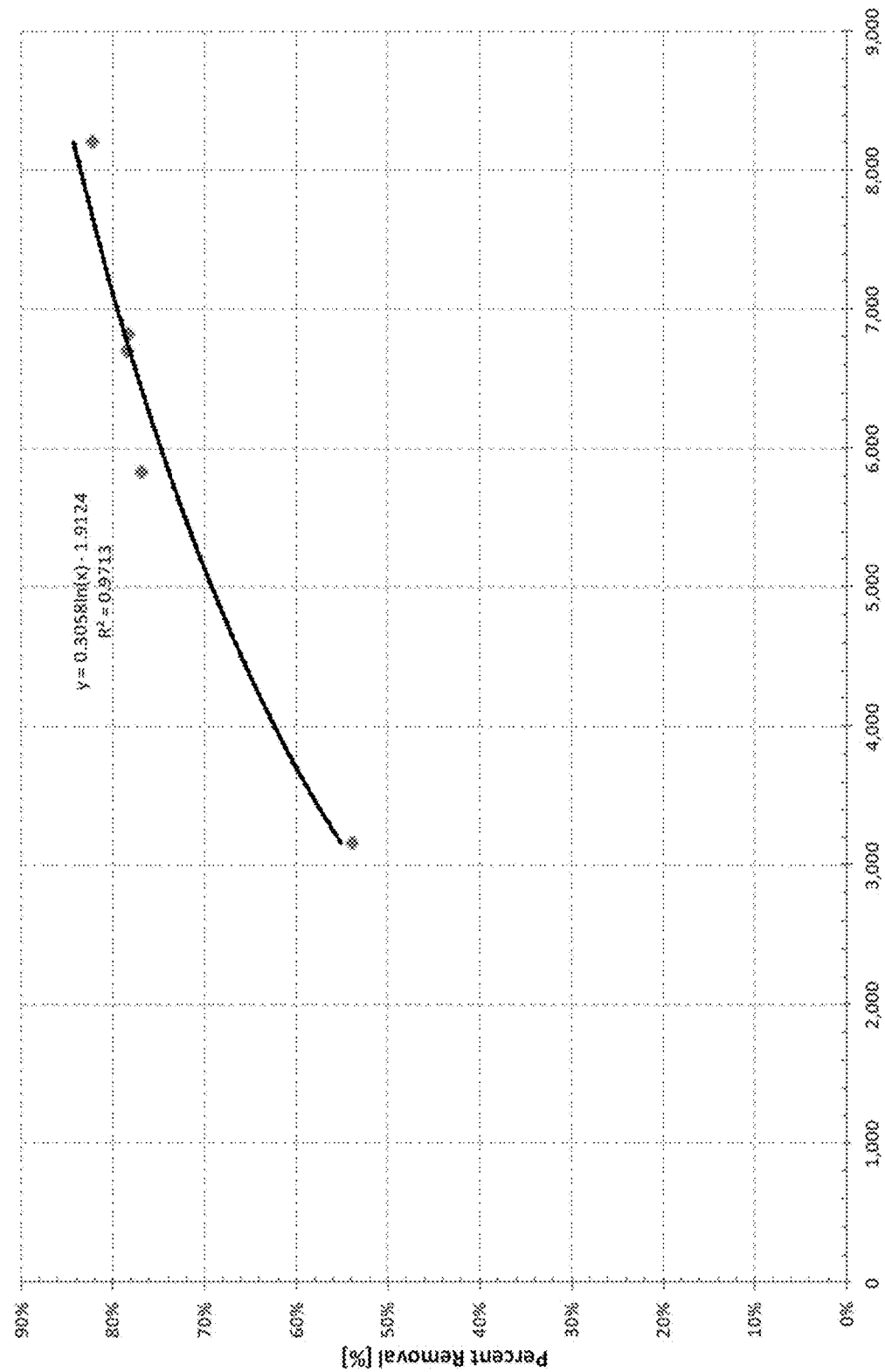
FIG. 11 is a plot of percent removal [%] vs. mass injection rate [lbm/hr].

All SBC injection coincided with ATI-2001™ injection as the ESP conditioning reagent. The data from SBC test is aggregated and is presented in FIGS. 10-11. The data presented in FIG. 10 considers only gross unit load conditions greater than 275 $MW_G$ with more than 60 minutes of stable $SO_2$ emission data. The associated regression coefficient ($R^2$) for the data set is 0.97, which is excellent given the number of process inputs used to compile the data. Given the $SO_2$ concentrations established during baseline testing, maximum observed removal with SBC was approximately 80% at loads greater than 275 $MW_G$. At 80% removal, the $SO_2$ emission rate ranged from 0.114 and 0.181 MMBtu. At low and mid-range load, removals in excess of 95% were observed which corresponded to emission rates ranging between 0.018 and 0.051 lb/MMBtu. The variation in the observed removals likely resulted from changes in process temperatures and velocities through the ESP. Additionally, the observed difference might be attributed to variations in coal sulfur during this testing period. At full load, no SBC injection performance data were gathered with an NSR greater than 1.9. It may be possible to achieve higher $SO_2$ removal levels with increased SBC injection rates. During the testing, mercury control was more severely impacted by SBC injection than by trona injection. Specifically during SBC injection, PAC injection at approximately 1.0 lb/MMacf was required to maintain the emission rate below 1.0 lb/TBtu when injecting at 3,800 lb/hr.

Continuous emissions monitoring systems $SO_2$ measurements averaged 0.462 lb/MMBtu and varied between 0.512 and 0.396 lb/MMBtu. During baseline full load mercury measurements, with $SO_3$ in service, total vapor-phase mercury averaged 0.74 lb/TBTU. When the $SO_3$ ash conditioning system was taken to standby and ATI-2001™ testing commenced, average vapor-phase mercury decreased to less than 0.10 lb/TBtu. This rapid decrease in mercury concentration is believed to have resulted from removing $SO_3$, coupled with high vapor-phase mercury oxidation realized from coal halogen addition. These factors allowed the unburned carbon from the boiler, in the form of LOI, to serve as a mercury sorbent and capture a large percentage of the vapor-phase mercury.

The short duration evaluation of mercury and acid gas control technologies at the utility plant facility successfully met the technical test objectives set out above. Findings included the following:

Electrostatic Precipitator Performance with Ash Conditioning:
The electrostatic precipitator was able to maintain electrical performance and permitted opacity levels when using the ATI-2001™ as an $SO_3$ ash conditioning surrogate.
Replacing $SO_3$ ash conditioning with ATI-2001™, with CaBr2 addition onto the coal, resulted in a reduction in vapor-phase mercury emissions from 1.04 lb/TBtu to less than 0.1 lb/TBtu.
A small, but measurable, difference in baseline opacity between the two conditioning agents was observed. Specifically, baseline opacity, at load conditions greater than 290 MWG, averaged 6.92% versus 6.98% with ATI-2001™.
Manual measurements (US EPA Method: 5, 26A, 201A, and 202) were conducted during baseline, constant rate Trona and SBC injection periods.
All baseline and injection test measurements demonstrated compliance with the filterable particulate threshold of 0.03 lb/MMBtu.
At load conditions greater than 290 MWG, SO2 baseline stack emission rates averaged 0.472 lb/MMBtu, based on plant CEMS data.
This difference is believed to result from the alkaline components of the fuel acting as a native (i.e. not injected) SO2 sorbent which neutralized the SO2 in the particulate control system.
Testing with both Trona and SBC demonstrated that utility plant can achieve reduced and stable SO2 emission rates using alkaline sorbent injection.
With Trona, maximum SO2 removal was observed to be approximately 67% over baseline measurements at injection rates of 10,275 and 11,670 lbm/hr.
During these Trona injection periods, SO2 emissions were measured to be 0.198 to 0.177 lb/MMBtu respectively. Removal with SBC was observed to be approximately 78% compared to baseline. SO2 emissions ranged from 0.181 to 0.144 lb/MMBtu at an injection rate of 5,821 to 6,692 lbm/hr.
The utility plant was able to maintain mercury emissions within the limits of the MACT regulation.
With both Trona and SBC, operation of ACI decreased mercury emissions to less than 1.2 lb/TBtu while maintaining high levels of SO2 removal.

A number of variations and modifications of the disclosure can be used. It would be possible to provide for some features of the disclosure without providing others.

For example in one alternative embodiment, the methods disclosed herein are directed not only to coal fired power plants but also can be employed in any system that generates a mercury and/or acid gas and/or particulate containing gas stream.

In another alternative embodiment, the non-$SO_3$-containing FGC agent can be used in other configurations and, for other solutions, at the waste gas treatment system. As shown in FIGS. 1-3, the alkaline earth metal additive or sorbent and a mercury removal agent or sorbent are optional.

In another alternative embodiment, the non-$SO_3$-containing FGC agent is used as an ESP upgrade alone, for particulate emission control. In some applications, the alternative FGC agent is used as a direct replacement of existing $SO_3$-based flue gas conditioning agents. In other applications, the non-SO$_3$-containing FGC agent is used in systems where the feed material 100 is a low sulfur coal. When existing higher sulfur coals are used as the feed material 100, there may be sufficient chlorine levels in the coal to oxidize the mercury in the flue gas and, if sufficient LOI is present in the ash, the ash may be able to achieve mercury control without the addition of activated carbon or other mercury removal agent.

In other alternative embodiments, the non-SO$_3$-containing FGC agent is used in waste gas treatment systems where a mercury removal agent (e.g., activated carbon) is not required for mercury control. In particular, the non-SO$_3$-containing FGC agent may be used in place of SO$_3$ at sites where lime-based DSI is being injected for acid gases.

In other embodiments, the non-SO$_3$-containing FGC agent is used in waste gas treatment systems where there is a combination of lime-based DSI and activated carbon injection ("ACT") being injected as a resistivity modifier.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
providing a halogen-treated feed material;
combusting the halogen-treated feed material to form a contaminated waste gas comprising particulates, an acid gas, and mercury;
injecting a non-sulfur trioxide-based conditioning agent into the contaminated waste gas for conditioning the particulates for one or more of electrostatic precipitation and particulate emission;
injecting a carbon sorbent into the waste gas to remove or cause the removal of mercury from the waste gas;
injecting a dry sorbent into the contaminated waste gas to remove or cause the removal of the acid gas from the waste gas; and
removing, after the injecting of each of the non-sulfur trioxide-based conditioning agent, the carbon sorbent and the dry sorbent, at least most of the mercury and particulates from the waste gas to produce a treated gas, wherein at least one of the following is true:
(i) wherein an amount of mercury removed from the waste gas by the carbon sorbent in the presence of the non-sulfur trioxide-based conditioning agent is at least the same as an amount of mercury removed from the waste gas by the carbon sorbent in the absence of the non-sulfur trioxide-based conditioning agent; and
(ii) wherein an amount of the acid gas removed from the waste gas by the dry sorbent in the presence of the non-sulfur trioxide-based conditioning agent is at least the same as an amount of the acid gas removed from the waste gas by the sorbent in the absence of the non-sulfur trioxide-based alkaline conditioning agent.

2. The method of claim 1, wherein (i) is true, wherein the carbon sorbent comprises activated carbon.

3. The method of claim 2, wherein the non-sulfur trioxide-based conditioning agent is flue gas conditioning agent sold under the tradename ATI-2001™.

4. The method of claim 2, wherein the injecting of the carbon sorbent in the contaminated waste gas is upstream of an air preheater; and wherein the injecting of the non-sulfur trioxide-based conditioning agent in the contaminated waste gas is downstream of the air preheater.

5. The method of claim 2, wherein the injecting of the carbon sorbent in the contaminated waste gas is at a first location downstream of a second location where the injecting of the non-sulfur trioxide-based alkaline sorbent in the contaminated waste gas and wherein a distance between the first and second locations is at least about 10 feet.

6. The method of claim 1, wherein (ii) is true and wherein the dry sorbent is one or more of trona, a bicarbonate, sodium bicarbonate, a hydroxide, and hydrated lime.

7. The method of claim 6, wherein the injecting of the dry sorbent in the contaminated waste gas is upstream of an air preheater.

8. The method of claim 6, further comprising:
contacting the dry sorbent with the waste gas downstream of an air preheater.

9. The method of claim 1, wherein (i) and (ii) are true and wherein the injecting of the dry sorbent in the contaminated waste gas is upstream of where the injecting of the carbon sorbent in the contaminated waste gas.

10. The method of claim 9, wherein each of the dry sorbent and the carbon sorbent are contacted with the contaminated waste gas upstream of an air preheater and wherein the injecting of the non-sulfur trioxide-based conditioning agent in the contaminated waste gas is downstream of the air preheater.

11. The method of claim 9, wherein the injecting of each of the dry sorbent and the carbon sorbent in the contaminated waste gas is downstream of an air preheater and wherein the injecting of the non-sulfur trioxide-based conditioning agent in the contaminated waste gas is downstream of the air preheater.

12. The method of claim 9, wherein the injecting of the dry sorbent in the contaminated waste gas is upstream of an air preheater, and wherein the injecting of each of the carbon sorbent and non-sulfur trioxide-based conditioning agent in the contaminated waste gas are downstream of the air preheater.

13. The method of claim 9, wherein the injecting of the carbon sorbent in the contaminated waste gas is upstream of an air preheater, and wherein the injecting of each of the dry sorbent and non-sulfur trioxide-based conditioning agent in the contaminated waste gas is downstream of the air preheater.

14. The method of claim 1, wherein the provided halogen-treated feed material comprises iodine and/or bromine.

15. The method of claim 1, wherein the non-sulfur trioxide-based conditioning agent contacts the contaminated waste gas when the non-sulfur trioxide-based conditioning agent is injected into the contaminated waste gas.

16. The method of claim 1, wherein the carbon agent contacts the contaminated waste gas when the carbon sorbent is injected into the contaminated waste gas.

17. The method of claim 1, wherein the dry sorbent contacts the contaminated waste gas when the dry sorbent is injected into the contaminated gas.

18. A method, comprising:
providing a halogen-treated feed material;
combusting the halogen-treated feed material to form a contaminated waste gas comprising particulates, sulfur dioxide ($SO_2$), and mercury;
contacting a non-sulfur trioxide-based conditioning agent with the contaminated waste gas by injecting the non-sulfur trioxide-based conditioning agent into the contaminated waste gas, wherein the contacting of the non-sulfur trioxide-based conditioning agent with the contaminated waste gas improves the ability of electrostatic precipitator to remove the particulates;
contacting a carbon sorbent with the contaminated waste gas by injecting the carbon sorbent into the contaminated waste gas, wherein the contacting of the carbon sorbent with the contaminated waste gas removes or causes the removal of mercury from the contaminated waste gas
contacting a dry sorbent with the contaminated waste gas by injecting the dry sorbent into the contaminated waste gas; and
after the injecting of each of the non-sulfur trioxide-based conditioning agent, the carbon sorbent and the dry sorbent, removing at least most of the mercury and particulates from the contaminated waste gas to produce a treated gas, wherein at least one of the following is true:
(i) wherein the non-sulfur trioxide-based conditioning agent does not diminish or otherwise inhibit mercury sorption by the carbon sorbent; and
(ii) wherein the contacting the dry sorbent with the contaminated waste gas removes or causes the removal of the acid gas from the contaminated waste gas and wherein the non-sulfur trioxide-based conditioning agent does not react or otherwise interact with the dry sorbent.

19. The method of claim 18, wherein the carbon sorbent is activated carbon.

20. The method of claim 18, wherein (i) is true, wherein the carbon sorbent comprises activated carbon and is contacted with the contaminated waste gas upstream of an air preheater, and wherein the non-sulfur trioxide-based conditioning agent is contacted with the waste gas downstream of the air preheater.

21. The method of claim 18, wherein (i) is true, wherein the carbon sorbent is contacted with the contaminated waste gas at a first location downstream of a second location where the non-sulfur trioxide-based conditioning agent is contacted with the contaminated waste gas, and wherein a distance between the first and second locations is at least about 10 feet.

22. The method of claim 18, wherein (ii) is true.

23. The method of claim 22, wherein the dry sorbent is contacted with the contaminated waste gas upstream of an air preheater.

24. The method of claim 22, wherein the dry sorbent is contacted with the contaminated waste gas downstream of a preheater.

25. The method of claim 18, wherein (i) and (ii) are true and wherein the dry sorbent is contacted with the contaminated waste gas upstream of where the carbon sorbent is contacted with the contaminated waste gas.

26. The method of claim 18, wherein (i) and (ii) are true, wherein both the dry sorbent and the carbon sorbent are contacted with the contaminated waste gas upstream of an air preheater, and wherein the non-sulfur trioxide-based conditioning agent is contacted with the contaminated waste gas downstream of the air preheater.

27. The method of claim 18, wherein (i) and (ii) are true, wherein both the dry sorbent and the carbon sorbent are contacted with the contaminated waste gas downstream of an air preheater, and wherein the non-sulfur trioxide-based conditioning agent is contacted with the contaminated waste gas downstream of the air preheater.

28. The method of claim 18, wherein (i) and (ii) are true, wherein the dry sorbent is contacted with the contaminated waste gas upstream of an air preheater, and wherein the carbon sorbent and the non-sulfur trioxide-based conditioning agent are contacted with the contaminated waste gas downstream of the air preheater.

29. The method of claim 18, wherein (i) and (ii) are true, wherein the carbon sorbent is contacted with the contaminated waste gas upstream of an air preheater, and wherein the dry sorbent and the non-sulfur trioxide-based conditioning agent are contacted with the waste gas downstream of the air preheater.

* * * * *